Patented Apr. 2, 1929.

1,707,604

UNITED STATES PATENT OFFICE.

HARRY C. FISHER, OF NORWOOD, OHIO, ASSIGNOR TO THE RICHARDSON COMPANY, OF LOCKLAND, OHIO, A CORPORATION OF OHIO.

DEINKING PAPER.

No Drawing.   Application filed September 28, 1927. Serial No. 222,686.

My invention relates to the process of de-inking paper pulp which contains newspaper, magazine or other printed stock and is treated with an alkali and simultaneously treated with a sulfonate or water soluble compound of sulfonic acid and hydrocarbons, say, a sodium sulfonate. The invention particularly relates to the de-inking process as set forth in pending application of Alan R. Lukens, Serial No. 38,934, filed June 22, 1925.

A study of the patent art and other literature shows that the success of de-inking lies not so much in the methods of loosening the ink from the paper as in the ways of removing the loosened ink from the cleaned pulp.

It is the special object of my process to provide a method for separating the ink from the paper in the beater and it consists in the method hereinafter described and claimed by which the separation of the inking matter can be readily and easily obtained without the necessity of the expensive and troublesome washing and filtering operations that have heretofore been necessary. While my process involves the use of sodium sulfonate as set forth in the Lukens application above referred to, it is equally applicable to the de-inking process regardless of the manner of loosening the ink from the paper and has particular reference to the method proposed causing the ink to float on the surface of the water whereby separation is readily obtained by skimming off the surface and allowing the ink freed pulp to sink down through the body of comparatively clean water.

The inky matter of macerated stock in the beater is loosened in any of the well known ways, preferably by the addition of a solution of soda ash or its equivalent and the agitation of the pulp with a sodium sulfonate or colloidal clay.

I then thoroughly agitate the treated pulp in which the ink has been loosened from the stock with a substantially or partially volatile liquid immiscible with water such as benzol so that a species of emulsion of water in oil or oil in water, as the case may be, is obtained in which the loosened ink forms the emulsifying agent to the extent that it coats the globules of one liquid in the other. The pulp with its oil loosened ink mixture is then pumped onto the surface of a body of clear water, heated to such a temperature that the oil will be substantially or partially volatilized, to be then condensed by any appropriate means, whereupon the ink will then float on the surface of the water so that it can be readily skimmed or spilled off and the ink-freed pulp sinks down through the body of comparatively clean water and can be readily drawn off, and if required, washed with a minimum amount of fresh water, when it is then ready for use.

As an example of the process, reduced to small quantities, 250 gms. of printed paper is thoroughly mascerated for some thirty minutes in a 6% solution of sodium carbonate, based on the weight of paper; then 1% of a selected organic sodium sulfonate is added to the paper pulp and beaten for several minutes until it is thoroughly worked into the pulp. The temperature of the pulp in the beater preferably being from 100 to 200° Fahrenheit. The ratio of water to the paper stock is about 250 gms. paper to 12,000 cc. of water. After the temperature of the pulp has fallen near that of the room temperature, 10 cc. of benzol is agitated with 400 cc. of pulp until the emulsion mixture is obtained.

The mixture is then poured on water of sufficient temperature to vaporize the benzol, say 200° Fahrenheit, and the vaporization proceeds rapidly until finally the inking material freed of the oil floats on the top of the water and the clean pulp sinks to the bottom of the vessel. The ink is then skimmed or floated off and the cleaned pulp withdrawn and rewashed if desired.

Substantially similar results can be obtained with the use of ordinary kerosene in place of the benzol, excepting that in this case the amount of kerosene vaporized will be small and that the freed inky matter will float in a layer of oil on the water.

It will be noted that the above examples are given as specific examples of the treatment and that the requirements of capacities and temperatures will be different under plant condition where arrangements can readily be made to continuously supply heat to the flotation vessels and beaters.

Having thus described my invention, what I claim as new and desire to secure by Letters Patent, is:—

1. The process of removing ink from fibrous pulp, which consists in soaking the pulp in a solution of an alkali to loosen the inky matter from the stock, then agitating the material with a volatile liquid immiscible with water, to form an emulsion of water and volatile liquid containing the inky matter, then vaporizing the volatile liquid permitting the inky matter to float on the surface of the solution and then removing same by skimming or spilling.

2. The process of removing ink from fibrous pulp, which consists in soaking the pulp in a solution of an alkali to loosen the inky matter from the stock, then agitating the material with a volatile liquid immiscible with water to form an emulsion of water and volatile liquid containing the inky matter, then depositing the material on a body of clean water maintained at a temperature which will volatilize the volatile liquid allowing the inky matter to float on the surface of the clean water and the pulp to sink to the bottom of the vessel to be thence removed.

3. The process of removing ink from fibrous pulp, which consists in soaking the pulp in a solution of an alkali in the presence of a sulfonic acid compound to loosen the inky matter from the stock, then agitating the material with a volatile liquid immiscible with water to form an emulsion containing the inky matter, then vaporizing the volatile liquid permitting the inky matter to float on the surface of the water and then removing the same by skimming or spilling.

4. The process of removing ink from fibrous pulp, which consists in soaking the pulp in a solution of an alkali in the presence of a sulfonic acid compound to loosen the inky matter from the stock, then agitating the material with a volatile liquid immiscible with water to form an emulsion containing the inky matter, then depositing the material on a body of clean water maintained at a temperature which will volatilize the volatile liquid allowing the inky matter to float on the surface of the clean water and the pulp to sink to the bottom of the vessel to be thence removed.

5. The process of removing ink from fibrous pulp, which consists in soaking the pulp in a solution of an alkali in the presence of a sulfonic acid compound to loosen the inky matter from the stock, then agitating the material with a volatile hydrocarbon liquid, then depositing the material on a body of clean water maintained at a temperature which will volatilize the volatile liquid allowing the inky matter to float on the surface of the clean water and the pulp to sink to the bottom of the vessel to be thence removed.

6. The process of removing ink from fibrous pulp, which consists in soaking the pulp in a solution of an alkali to loosen the inky matter from the stock, then agitating the material with a volatile hydrocarbon liquid, then depositing the material on a body of clean water maintained at a temperature which will volatilize the volatile liquid allowing the inky matter to float on the surface of the clean water and the pulp to sink to the bottom of the vessel to be thence removed.

7. The process of de-inking paper, which consists in soaking it in an alkaline solution to loosen the ink, pulping the mass, agitating the pulped material with a volatile liquid immiscible with water to form an emulsion containing the inky matter, then depositing the emulsion mixture on the surface of a body of clean water maintained at a temperature which will volatilize the volatile liquid allowing the inky matter to float on the surface of the water and the pulp to sink to the bottom of the vessel to be thence removed.

8. The process of de-inking paper, which consists in soaking it in an alkaline solution to loosen the ink, pulping the mass in the presence of a sulfonic acid compound, agitating the pulped material with a volatile liquid immiscible with water to form an emulsion containing the inky matter, then depositing the emulsion mixture on the surface of a body of clean water maintained at a temperature which will volatilize the volatile liquid allowing the inky matter to float on the surface of the water and the pulp to sink to the bottom of the vessel to be thence removed.

9. The process of removing ink from fibrous pulp, which consists in soaking the pulp in an alkaline solution to loosen the inky matter from the stock, then agitating the material with a volatile liquid immiscible with water, to form an emulsion of water and volatile liquid containing the inky matter, then vaporizing the volatile liquid permitting the inky matter to float on the surface of the solution and then removing same by skimming or spilling.

10. The process of removing ink from fibrous pulp, which consists in soaking the pulp in an alkaline solution in the presence of a sulfonic acid compound to loosen the inky matter from the stock, then agitating the material with a volatile liquid immiscible with water to form an emulsion containing the inky matter, then vaporizing the volatile liquid permitting the inky matter to float on the surface of the water and then removing the same by skimming or spilling.

11. The process of removing ink from fibrous pulp, which consists in soaking the pulp in an alkaline solution in the presence of a sulfonic acid compound to loosen the inky matter from the stock, then agitating the material with a liquid immiscible with water, then depositing the entire material on a body of water, whereupon the inky matter will float in oil on the surface of the body of water and the ink-freed pulp will sink to the bottom of the body of water.

HARRY C. FISHER.